United States Patent
Hunt

(10) Patent No.: US 10,267,318 B2
(45) Date of Patent: Apr. 23, 2019

(54) METHOD AND SYSTEM FOR TUNING A TURBINE USING A SECONDARY INJECTION VALVE

(71) Applicant: Fluid Equipment Development Company, LLC, Monroe, MI (US)

(72) Inventor: Jason B. Hunt, Monroe, MI (US)

(*) Notice: Subject to any disclaimer, the term of this patent is extended or adjusted under 35 U.S.C. 154(b) by 601 days.

(21) Appl. No.: 14/662,378

(22) Filed: Mar. 19, 2015

(65) Prior Publication Data
US 2015/0267706 A1 Sep. 24, 2015

Related U.S. Application Data

(60) Provisional application No. 61/968,581, filed on Mar. 21, 2014.

(51) Int. Cl.
*F01D 17/10* (2006.01)
*F03B 3/18* (2006.01)
(Continued)

(52) U.S. Cl.
CPC .......... *F04D 17/10* (2013.01); *F01D 17/105* (2013.01); *F03B 3/186* (2013.01); *F04D 25/02* (2013.01); *F04D 27/003* (2013.01); *F16K 31/122* (2013.01); *F05B 2220/40* (2013.01); *F05D 2220/40* (2013.01); *Y02E 10/223* (2013.01)

(58) Field of Classification Search
CPC ........ F01D 17/105; F04D 17/10; F04D 25/02; F04D 27/003; F04D 27/023; F04D 27/0238; F03B 3/186; F16K 31/122; F16K 31/1221; F16K 31/1223; F16K 31/1226;
(Continued)

(56) References Cited

U.S. PATENT DOCUMENTS 2,247,151 A   6/1941  Clarke
3,270,495 A * 9/1966  Connor ................... F01D 17/12
                                                  415/205
(Continued)

FOREIGN PATENT DOCUMENTS

CN    103557069 A    2/2014
EP      0086466 A1   8/1983
FR     1337654 A  *  9/1963  ........... F01D 17/105

OTHER PUBLICATIONS

Machine translation of FR 1337654 A (Sep. 13, 1963) from Espacenet.*
(Continued)

*Primary Examiner* — Igor Kershteyn
*Assistant Examiner* — Christopher R Legendre
(74) *Attorney, Agent, or Firm* — Harness, Dickey & Pierce, P.L.C.

(57) ABSTRACT

A turbine and method of operating a turbine includes a housing having an inlet, a volute and an outlet. The inlet is coupled to the volute through a primary fluid path and a secondary fluid path. The turbine further includes an impeller rotatably coupled to the housing and a hydraulically actuated valve assembly disposed within the secondary fluid path selectively communicating fluid from the inlet to the volute. The turbine includes a hydraulic actuator coupled to the valve assembly moving the valve assembly from a first position communicating fluid from the inlet into the volute to a second position blocking flow from the inlet to the volute.

7 Claims, 6 Drawing Sheets

(51) Int. Cl.
*F04D 17/10* (2006.01)
*F04D 25/02* (2006.01)
*F04D 27/00* (2006.01)
*F16K 31/122* (2006.01)

(58) Field of Classification Search
CPC ............... F16K 31/126; F16K 31/1262; F16K 31/1266; F16K 31/1268
See application file for complete search history.

(56) References Cited

U.S. PATENT DOCUMENTS

| | | | | |
|---|---|---|---|---|
| 4,672,843 A * | 6/1987 | Pozniak | ................ | F02P 5/1455 |
| | | | | 73/114.16 |
| 5,018,948 A * | 5/1991 | Sjtöholm | .............. | F04C 28/125 |
| | | | | 417/302 |
| 6,067,946 A * | 5/2000 | Bunker | ..................... | F01L 9/02 |
| | | | | 123/90.12 |
| 6,345,961 B1 * | 2/2002 | Oklejas, Jr. | .......... | B01D 61/022 |
| | | | | 415/104 |
| 7,975,533 B2 * | 7/2011 | Andrie | ...................... | F01L 1/46 |
| | | | | 73/114.16 |
| 2015/0144816 A1 * | 5/2015 | Hoang | ................... | E21B 29/04 |
| | | | | 251/31 |
| 2015/0267706 A1 * | 9/2015 | Hunt | ....................... | F04D 17/10 |
| | | | | 415/1 |

OTHER PUBLICATIONS

International Search Report and Written Opinion regarding Application No. PCT/US2015/021650 dated Jun. 8, 2015.

* cited by examiner

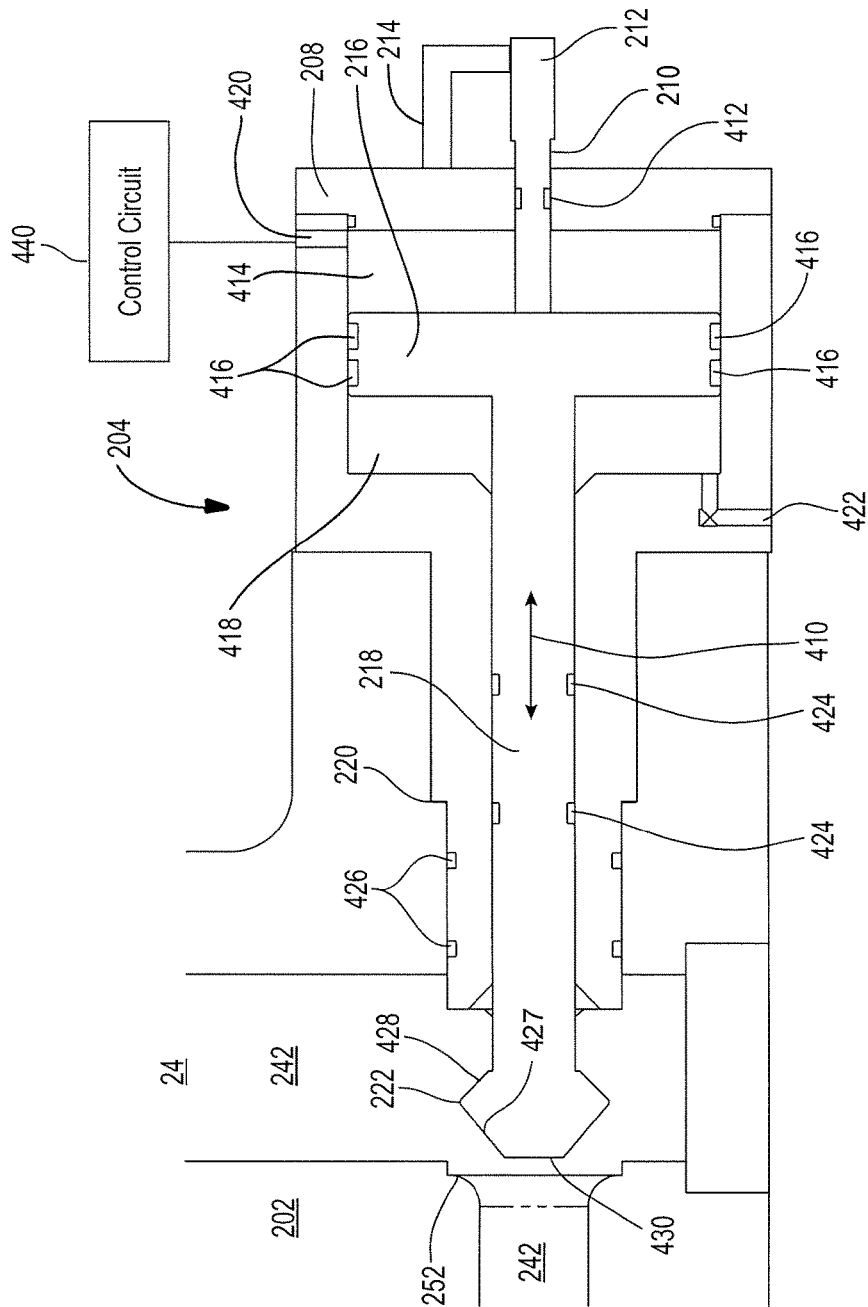

METHOD AND SYSTEM FOR TUNING A TURBINE USING A SECONDARY INJECTION VALVE

RELATED APPLICATION

This application is a non-provisional application of provisional application 61/968,581, filed Mar. 21, 2014, the disclosure of which is incorporated by reference herein.

TECHNICAL FIELD

The present disclosure relates generally to turbines, and, more specifically, to a method and system for controlling an amount of fluid in a control cavity using a hydraulically controlled secondary valve.

BACKGROUND

The statements in this section merely provide background information related to the present disclosure and may not constitute prior art.

Turbochargers are used for many applications. A turbocharger includes a pump portion and a turbine portion. Turbochargers are used for recovering energy from a pressurized stream of fluid. Excessive pressure in the turbine portion is used to drive the pump portion. One use for a turbocharger is recovering energy from a brine outlet of a reverse osmosis membrane assembly.

Reverse osmosis systems operate in a wide range of operating conditions for any given flow while seeking to maintain a high level of performance. Various turbine configurations are known for improving levels of performance for the turbine.

In one known turbine, single volute nozzle volute systems use a valve stem to allow bypass fluid from the turbine inlet to the impeller. Some improvement in performance is achieved. A valve is used to control the amount of fluid in the bypass. Manually controlled valves require a person to physically move the control wheel using high torque. This is not practical especially in systems with multiple stages. Electrically controlled valves can be automated. However, due to the high torque involved in turning the valves, the systems for rotating the valves are expensive.

SUMMARY

The present disclosure provides a turbine design that allows for controlling an amount of fluid entering a control volume using a hydraulically controlled valve in a bypass path.

In one aspect of the disclosure, a turbine includes a housing having an inlet, a volute and an outlet. The inlet is coupled to the volute through a primary fluid path and a secondary fluid path. The turbine further includes an impeller rotatably coupled to the housing, and a hydraulically actuated valve assembly disposed within the secondary fluid path selectively communicating fluid from the inlet to the volute. The turbine includes a hydraulic actuator coupled to the valve assembly moving the valve assembly from a first position communicating fluid from the inlet into the volute to a second position blocking flow from the inlet to the volute.

In another aspect of the disclosure, method of operating a turbine includes communicating fluid from an inlet of the turbine to a volute through a primary fluid path and selectively communicating fluid from the inlet of the turbine to the volute through a secondary path fluid path through a hydraulically controlled valve assembly. The hydraulically controlled valve assembly comprises a housing and a piston head defining a control cavity and a valve stem having a valve head thereon. The method further comprises communicating fluid to the control cavity, moving the valve head relative to a valve seat, and changing an amount of fluid flowing though the primary fluid path to the volute in response to communicating fluid to the control cavity.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4 is a cutaway view of the hydraulic valve assembly according to the present disclosure.

DETAILED DESCRIPTION

Figure 1A:
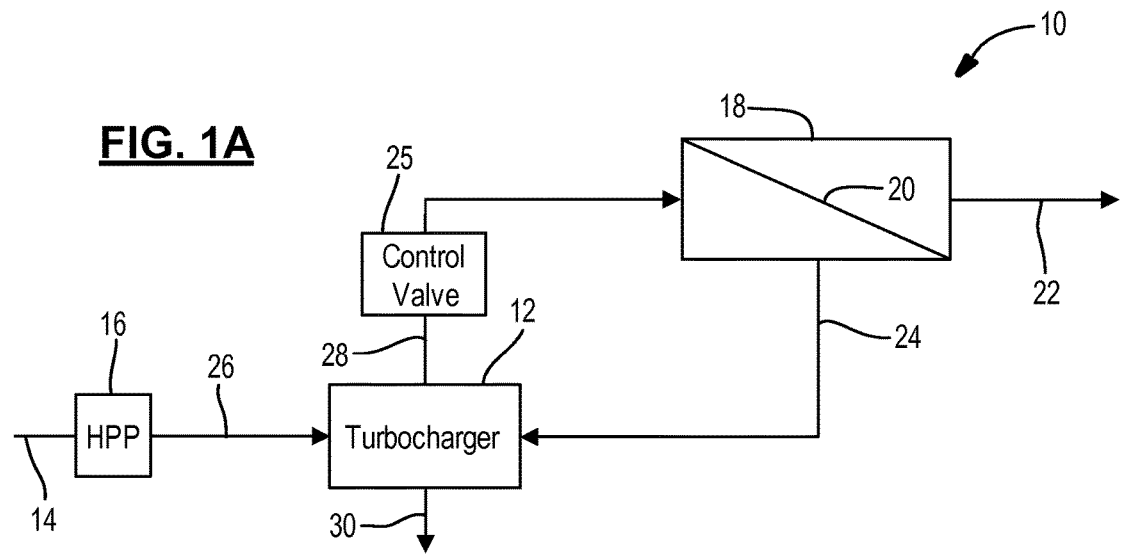
FIG. 1A is a block diagrammatic view of a reverse osmosis system that includes a turbocharger.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

The present disclosure improves the hydraulic range of a turbine by allowing a variable amount of fluid to be communicated to the volute. The turbine has a primary fluid path and a secondary fluid path for communicating fluid from the inlet to the volute. The primary path is always open. As will be described below, a hydraulically actuated valve is attached to the turbine housing and opens and closes (including positions therebetween) a secondary fluid path from the inlet to the volute The turbocharger described below may be used for various types of systems, including a reverse osmosis system. Non-hydraulic applications such as natural gas processing are also possible. Further, the valves used in the turbocharger may be controlled based upon various process parameters.

Referring now to FIG. 1A, a reverse osmosis system 10 that includes a turbocharger 12 is set forth. In this example, feed fluid from an input manifold 14 is communicated through a high pressure pump 16 which in turn is communicated to a membrane housing 18 through the turbocharger 12. The membrane housing 18 includes a reverse osmosis membrane 20 that is used to generate fresh water from sea water. Fresh water is generated at the permeate output 22 of the membrane housing. A brine stream from the membrane housing is directed to an inlet 24 of the turbocharger 12 through a brine control valve 25 selectively communicates the fluid from the turbocharger 12 to the membrane housing 18. The turbocharger 12 uses the energy from the high pressure brine stream to increase feed fluid pressure. The pressurized feed fluid from the high pressure pump 16 is received through a pump input 26. The turbocharger 12 increases the pressure of the feed fluid and increases the pressure of the feed fluid at the pump output 28. Waste from the turbocharger 12 is discharged at a lower pressure through the turbocharger outlet 30. Although one specific example of a reverse osmosis system 10 is illustrated, various examples for reverse osmosis systems will be evident to those skilled in the art. By providing the turbocharger 12, the required pressure from the high pressure pump is reduced and the overall energy consumed by the system is also reduced as compared to a system without the turbocharger 12.

Figure 1B:
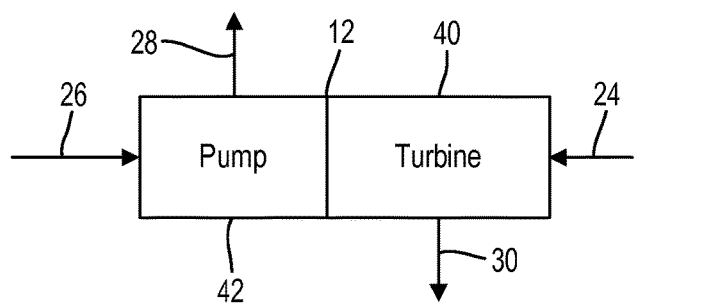
FIG. 1B is a block diagrammatic view of the turbocharger of FIG. 1A.

Referring now to FIG. 1B, the turbocharger 12 is illustrated in further detail. The turbocharger 12 includes a turbine portion 40 and a pump portion 42. The turbine portion 40 recovers energy from the high pressure stream by rotating and ultimately rotating the components within the pump portion 42. The pump is used to increase the pressure of fluid to the input of the membrane housing 18.

Figure 1C:
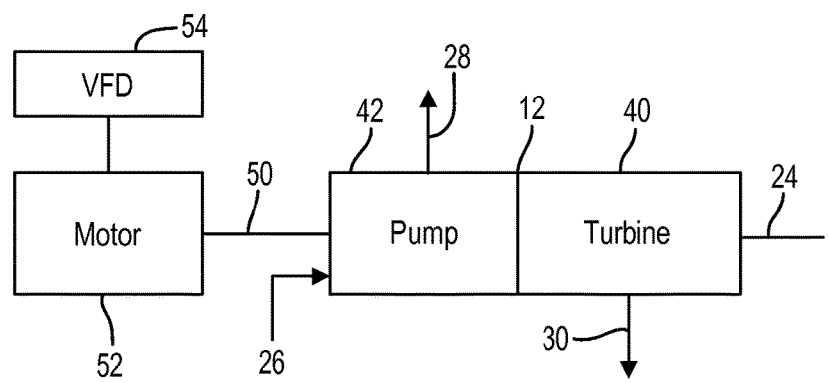
FIG. 1C is a block diagrammatic view of a turbocharger and motor assembly referred to as a HEMI.

Referring now to FIG. 1C, the turbocharger 12 may also be incorporated into a system that includes a common shaft 50 that extends not only through the pump and turbine portion illustrated in FIG. 1B but extends to a motor 52. The motor 52 includes a controller 54 the addition of the motor 52 allows the turbocharger to act as a pump when desired. The controller 54 may be used to drive the motor 52. The controller 54 may be referred to as a variable frequency device. The motor 52 may also act as a generator to recover the excess power generated.

Figure 2A:
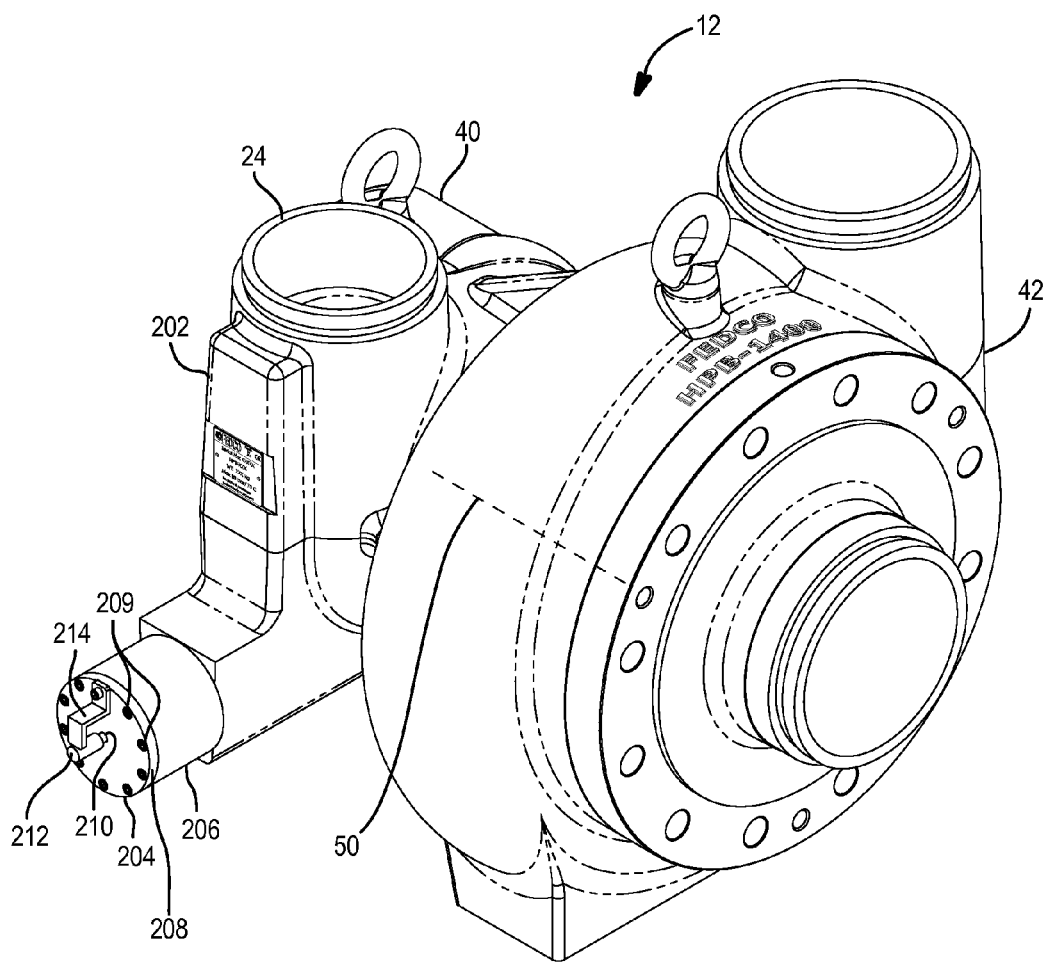
FIG. 2A is a perspective view of the hydraulic valve assembly on a turbocharger according to the present disclosure.
Figure 2B:
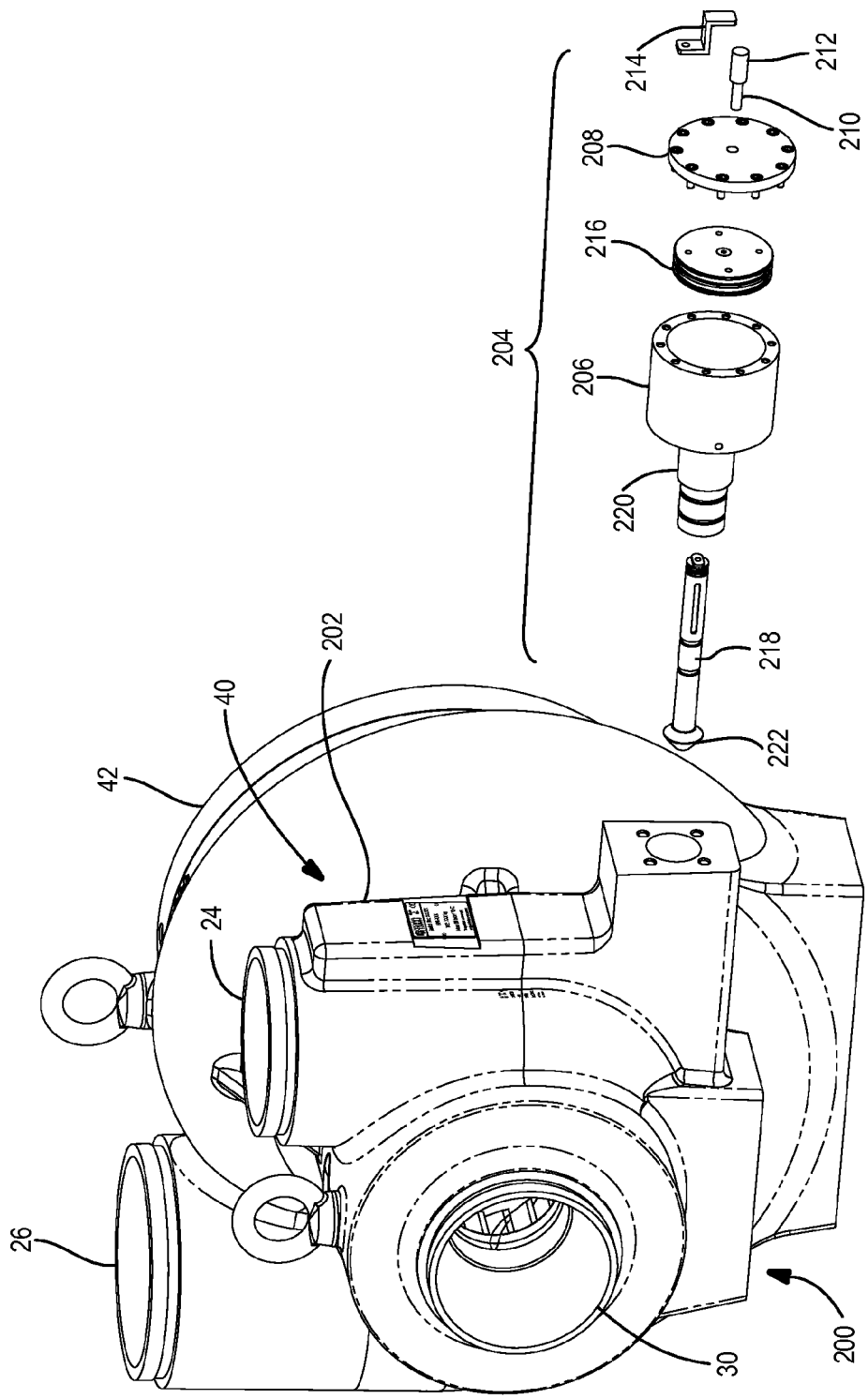
FIG. 2B is an exploded view of the of the hydraulic valve assembly of the turbocharger according to the present disclosure.

Referring now to FIGS. 2A and 2B, an assembled view and an exploded view of a turbocharger 12 is illustrated. In this example, the turbine portion 40 and a pump portion 42 having a common shaft 50 therebetween (as denoted by the dotted line). The turbine portion 40 includes a turbine housing assembly 202 and a hydraulically controlled valve assembly 204. The turbine housing assembly 202 includes the brine stream the inlet 24. The turbine outlet 30 is not illustrated in the perspective of FIG. 2A.

The hydraulically controlled valve assembly 204 has a piston housing 206 coupled to the turbine housing assembly 202 and an end cap 208. Fasteners 209 may be used to secure the end cap 208 to the piston housing 206.

The hydraulically controlled valve assembly 204 has a linear guide 210 that is in physical communication with a position sensor 212 and which extends through the end cap 208. The linear guide 210 is movable in a direction parallel with the direction of movement of a piston head 216 and valve stem 218 that is coupled thereto. The linear guide 210 may extend into the hydraulically controlled valve assembly 204 a varying amount.

The position sensor 212 may be coupled to the housing 202 with a holder 214. The position sensor 212 may be various types of sensors used to determine the relative position of the linear guide 210. The position sensor 212 generates a position signal corresponding to the linear position. The position sensor 212 may, for example, be formed of a linear potentiometer that changes an output signal or voltage based upon the position of the linear guide 210. The position sensor 212 may also be a linear encoder that provides the relative position of the linear guide 210 to a controller as described below. The position sensor 212 may also be comprised of a limit switch if exact positions of the system are not required. Details of the movement of the linear guide 210 and the position sensor 212 will be described in more detail below.

The valve stem 218 is coupled to the piston head 216 and moves together therewith during use. The housing comprises a valve guide 220. The valve guide 220 may be integrally formed with the piston housing 206. The valve guide 220 positions the valve stem 218 so that the valve head 222 is positioned in the desired position relative to a valve seat as is described below.

Figure 3:
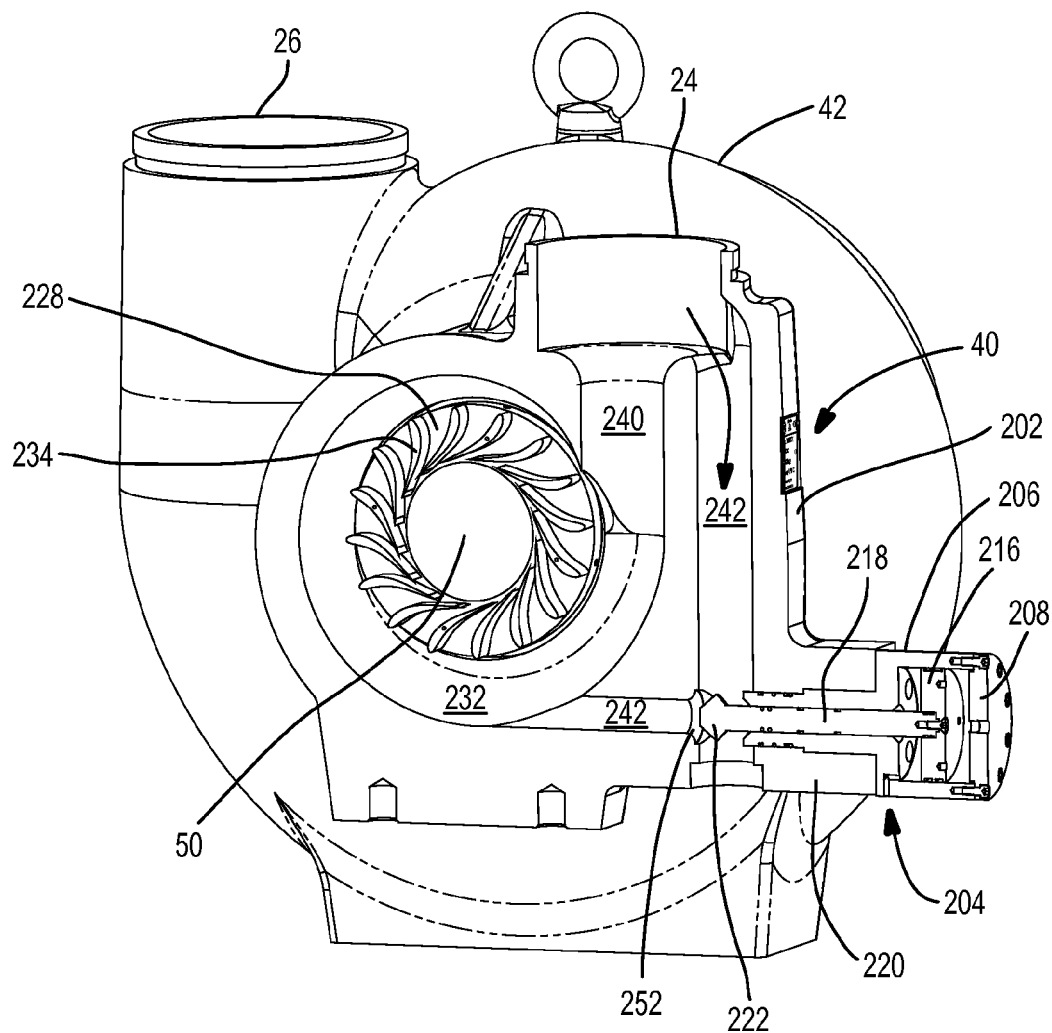
FIG. 3 is a cutaway perspective view of the turbocharger and valve assembly.

Referring now to FIG. 3, an end view of the turbine assembly 200 illustrating the turbine housing assembly 202, the volute 232, the hydraulically controlled valve assembly 204 and the inlet 24 are set forth in an assembled manner. The hydraulically controlled valve assembly 204 is set forth without the position sensor 212, guide 210 and the holder 214 for simplicity.

The shaft 50 is coupled to and rotates with a turbine impeller 228. The shaft 50 represents the axis of rotation of the impeller 228. The shaft 50 may extend out of the turbine housing 202 into the pump portion 42 of the turbocharger as described above. The impeller 228 has impeller vanes 234 that are used to receive pressurized fluid and rotate the shaft 50.

The housing 202 has a primary fluid path 240 from the turbine inlet 24 to the volute 232. The primary fluid path 240 has a fixed width to allow fluid to pass therethrough. The primary fluid path 240 does not change. That is, fluid is always communicating therethrough during operation. A secondary fluid path 242 also communicates fluid from the inlet 24 to the volute 232. The secondary fluid path 242 has the hydraulic actuated valve assembly 204 disposed therein. The hydraulically controlled valve assembly 204 is used to selectively move between an opened and closed position in the secondary fluid path 242. Thus, the valve assembly 204 may be partially opened or closed. The hydraulically controlled valve assembly 204 is illustrated in an open position. However, as the valve stem 218 moves, the valve head 222 contacts the valve seat 252. The valve seat 252 may be formed as part of the housing 202.

Referring now to FIG. 4, details of the hydraulically controlled valve assembly 204 is set forth. In this example, the piston head 216 and the valve stem 218 moves in the direction indicated by the arrows 410, which corresponds to the longitudinal axis of the valve assembly 204. The linear guide 210 that moves the position sensor 212 also moves in the direction indicated by the arrows 410. The linear guide 210 may have seals 412 that seal a control cavity 414 from the external environment to prevent leakage. The piston head 216 may also include seals 416. The seals 416 may be referred to as piston rings. The seals 416 prevent fluid from within the control cavity 414 from leaking outside of the control cavity 414.

The piston head 216 divides the piston housing 206 into the control cavity 414 and a movement area 418 that allows the piston to travel back and forth and expand and contract the control cavity 414.

An inlet port 420 is used to provide a control fluid to the control cavity 414. By providing a high pressure fluid to the control cavity 414, the control cavity 414 is expanded and the piston head 216 is moved toward the valve seat 252. When a low pressure fluid is provided to the control cavity 414, the piston head 216 moves toward the inlet port 420. This, in turn, moves the valve stem 218 and the valve head 222 away from the valve seat 252.

An exit port 422 is in fluid communication with the movement area 418. The inlet port 420 allows any air to escape the volume between the piston head 216 and the other part of the piston housing 206.

In an alternative embodiment, the exit port 422 may be used to provide high pressure into the movement area 418 while the inlet portion 420 is used as an inlet port for the control cavity 414 which is exposed to a low pressure. In this manner, the piston head 216 may be forced toward the inlet 420.

A plurality of seals 424 may be used to seal the valve stem 218 within the valve guide 220. The valve guide 220 may be sealed within the housing 202 with seals 426.

A control circuit 440 may be coupled to the inlet port 420. As mentioned briefly above, the control circuit 440 may also be coupled to the exit port 420. The control circuit 440 may be combination of valves that are electrically controlled to provide fluid paths to the control cavity 414 to control the movement of the piston head 216 and the valve stem 218 attached thereto. By controlling the movement of the valve stem 218, the opening and closing of the hydraulically controlled valve assembly 204 is controlled.

The valve head 222 may include an angular seal surface 427 that is used for engaging the seal seat 252 to form a seal therebetween. The seal prevents fluid flow through the secondary fluid path 242. An angular surface 428 may couple the valve stem 218 to the seal surface. The valve head 222 may also include a flat surface 430. In this example, the flat surface 430 is perpendicular to the longitudinal axis of the valve stem 218.

Figure 5A:
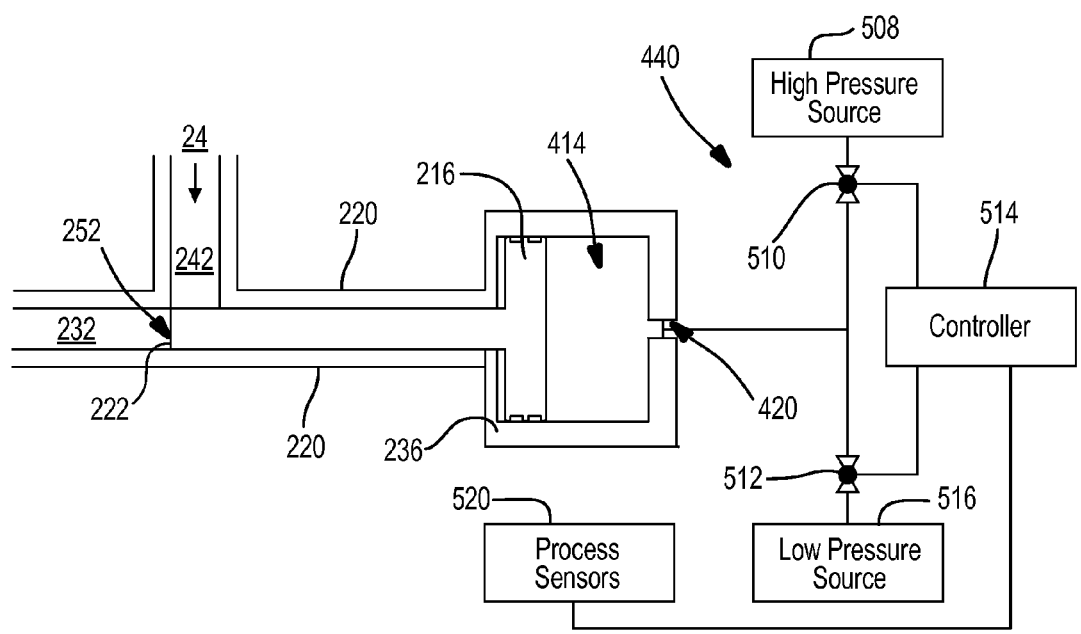
FIG. 5A is a schematic view of a control circuit for control of the hydraulically actuated valve assembly in a closed position.

Referring now to FIG. 5A, a simplified hydraulic control diagram is illustrated in which the control circuit 440 provides high pressure fluid to the control cavity 414. In this example, the valve head 222 is shown in a closed position. That is, the fluid from the inlet 24 does not travel through secondary fluid path 242 to the volute 232. In this example, valve 510 is in an open position to allow high pressure fluid from the high pressure source 508 into the control cavity 414 through the inlet port 420. The low pressure valve 512 is in a closed position. The high pressure valve or the low pressure valve may be a normally open valve for failsafe operation. When the high pressure valve is a normally open valve, the system will close the valve assembly 204 upon loss of power or control. If the low pressure valve 512 is replaced with a normally open valve, the system will open the secondary fluid path 242 upon loss of system power or shutdown. The choice between which valve is normally open is based on design considerations.

A controller 514 controls the operation of the valves 510, 512. During operation, typically either the high pressure valve 510 or the low pressure valve 512 is open to allow a varying amount of fluid to pass though the valve assembly 204 and through the fluid path 242. However, during a cleaning process or other type of process, both valves 510 and 512 may be opened. The controller 514 is in communication with a plurality of process sensors 520. The process sensors 520 may include the position sensor illustrated above. Other types of sensors such as temperature sensors, flow sensors, flow rate sensors, or the like may be used by the controller 514 to determine whether to open or close the high pressure valve 510 or the low pressure valve 512 to change the amount of fluid passing through the fluid path 242. It should be noted that both valves 510 and 512 may be closed when no change is desired in the position of the valve head 222 relative to the valve seat 252. From an at-rest position, the piston head 216, the valve stem 218 and valve head 222 may be moved by introducing high pressure fluid into the inlet port 420. To move the piston head 216 and valve head 222 toward the valve seat 252, low pressure may be exposed to the control cavity 414 through the low pressure valve 512.

Feedback control is achieved by periodically monitoring the process variables using the process sensors 520. The controller 514, in response to the process sensors 520, open and close the appropriate valves 510, 512 to change the opening between the valve head 222 and the valve seat 252. The process variables are described below:

| Loop Forever | |
| --- | --- |
| $E = (P - S) / S$ | Calculate error percentage |
| If $E > 1$ then $E = 1$ | Limit error to range $[-1 \ldots 1]$ |
| If $E < -1$ then $E = -1$ | |
| TO = K E T | Compute valve open time |
| TC = T - TO | Compute valve closed time |
| If $E > D$ | Check for outside of deadband |
| Open V1 for time TO | Open V1 to close primary fluid path |
| Close V1 for time TC | |
| If $E < -D$, | Check for outside of deadband |
| Open V2 for time TO | Open V2 to open primary fluid path |
| Close V2 for time TC | |

P—Process variable, measured value.
S—Set point for process.
E—Current error (percent).
K—Proportional gain (~1, tunable value).
D—Deadband in percent (typically 1%).
T—Update time period (typically 5 seconds).
TO—Valve open time period.
TC—Valve close time period.

In the above algorithm the error percentage is calculated between a range of −1 and +1. The valve open time and the valve close time may be calculated using a proportional gain, a current error and an update. A deadband D may be compared to the current error. When the current error is outside of the deadband, the valve may be opened or closed. That is, when the error is greater than the deadband, valve 510 is opened to close the amount of the opening of valve assembly 204. When the error is less than the negative deadband, then the valve 512 is opened so that the piston moves toward the control port.

Figure 5B:
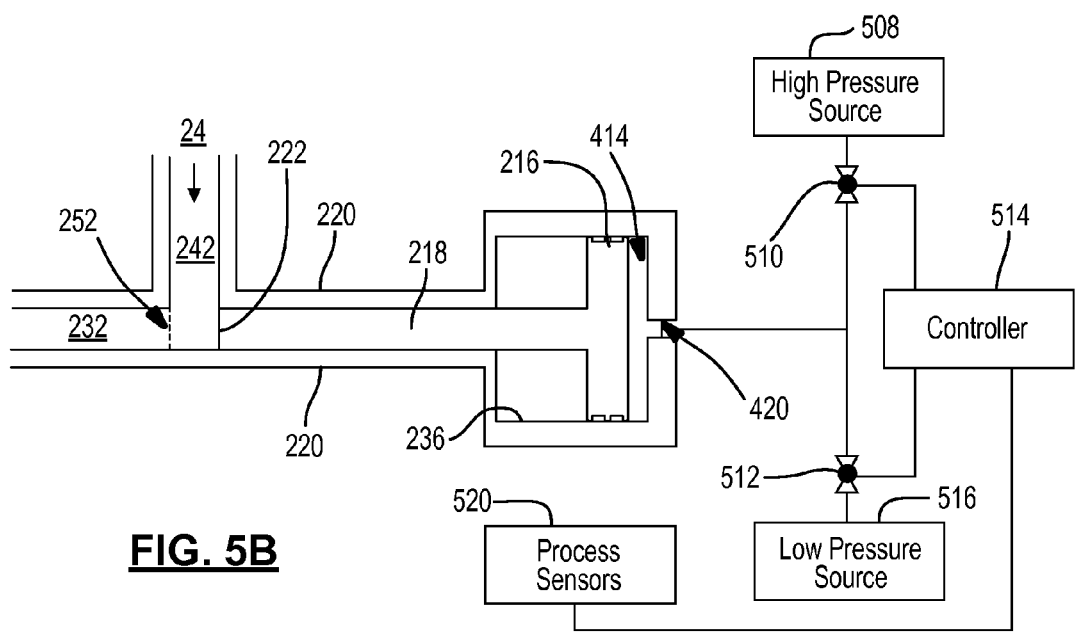
FIG. 5B is a schematic view of a control circuit for control of the hydraulically actuated valve assembly in an open position.

Referring now to FIG. 5B, the piston 216 is illustrated toward the inlet port 420. To move the piston 216 toward the inlet port 420 as compared to that in FIG. 5A, the high pressure valve is 510 is closed and the low pressure valve 512 is opened. This causes the valve head 222 to be in an open position to allow flow through the valve. A plurality of valve head positions may be achievable between the valve head positions illustrated in FIGS. 5A and 5B so that the flow through the fluid path 242 may be varied.

In both FIGS. 5A and 5B high pressure source 508 and the low pressure source 516 may be hydraulically coupled to the turbine portion. That is, the high pressure source 508 may be in fluidic communication with the turbine inlet 24 which is a high pressure source. The low pressure source 516 may be coupled to the turbine outlet 30 or even to the atmosphere.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A turbine in communication with a high pressure source and a low pressure source comprising:
    a housing having an inlet, a volute and an outlet, said inlet coupled to the volute through a primary fluid path and a secondary fluid path;
    an impeller rotatably coupled to the housing;
    a hydraulically actuated valve assembly disposed within the secondary fluid path selectively communicating fluid from the inlet to the volute, said hydraulically actuated valve assembly comprising a valve head, a valve stem and a valve seat;
    a hydraulic actuator coupled to the high pressure source through a first valve and the low pressure source through a second valve, said hydraulic actuator coupled to the hydraulically actuated valve assembly and configured to move the hydraulically actuated valve assembly from a first position communicating fluid from the inlet into the volute to a second position blocking flow from the inlet to the volute and to selectively fluidically couple a control cavity to the high pressure source through the first valve and a port in a piston housing and selectively fluidically couple the control cavity to the low pressure source through the second valve and the port, wherein the valve stem is coupled to a piston within the piston housing, said piston and said piston housing defining the control cavity within the piston housing;
    a linear guide extending into the control cavity and moveably coupled to a surface of the piston;
    a position sensor coupled to the housing, said position sensor generating a position sensor signal indicating a position of the valve head relative to the valve seat in response to a relative position of the linear guide to the position sensor; and
    a controller coupled to the first valve and the second valve, said controller controlling the first valve and the second valve in response to the position sensor signal.

2. The turbine as recited in claim 1 wherein the valve assembly comprises a plurality of positions of the valve head between the first position and the second position.

3. The turbine as recited in claim 1 wherein the first valve comprises a first normally open valve and the second valve comprises a second normally open valve.

4. A system comprising:
    the turbine as recited in claim 1 comprising a shaft; and
    a pump coupled to the shaft.

5. The system as recited in claim 4 further comprising a reverse osmosis housing in communication with the turbine and the pump.

6. A method of operating a turbine having a housing comprising:
    communicating fluid from an inlet of the turbine to a volute through a primary fluid path;
    selectively communicating fluid from the inlet of the turbine to the volute through a secondary fluid path through a hydraulically controlled valve assembly, said hydraulically controlled valve assembly comprising a piston housing and a piston head defining a control cavity within the piston housing, said control cavity fluidically coupled to a port that extends through the piston housing, said hydraulically controlled valve assembly further comprising a valve stem having a valve head that moves relative to a valve seat;
    selectively communicating fluid to the control cavity from a high pressure source through a first valve and the port and a low pressure source through a second valve and the port;
    in response to selectively communicating fluid to the control cavity, moving the piston head within the piston housing and moving the valve head relative to the valve seat;
    moving a linear guide extending into the control cavity in response to movement of the piston head;
    determining a position of the valve head relative to the valve seat by generating a position signal corresponding to a relative position of a position sensor coupled to the housing and the linear guide; and
    controlling an amount of fluid flowing through the secondary fluid path to the volute by controlling fluid to the control cavity by controlling the first valve and the second valve in response to the position of the valve head relative to the valve seat corresponding to the position signal.

7. The method as recited in claim 6 wherein communicating fluid to the control cavity comprises communicating fluid through the first valve from the high pressure source and communicating low pressure fluid from the low pressure source through the second valve.

* * * * *